Jan. 16, 1923.
J. BAMFORD ET AL.
DRIVING GEAR FOR CONVERGING SHAFTS.
FILED AUG. 29, 1922.
1,442,513
3 SHEETS-SHEET 1
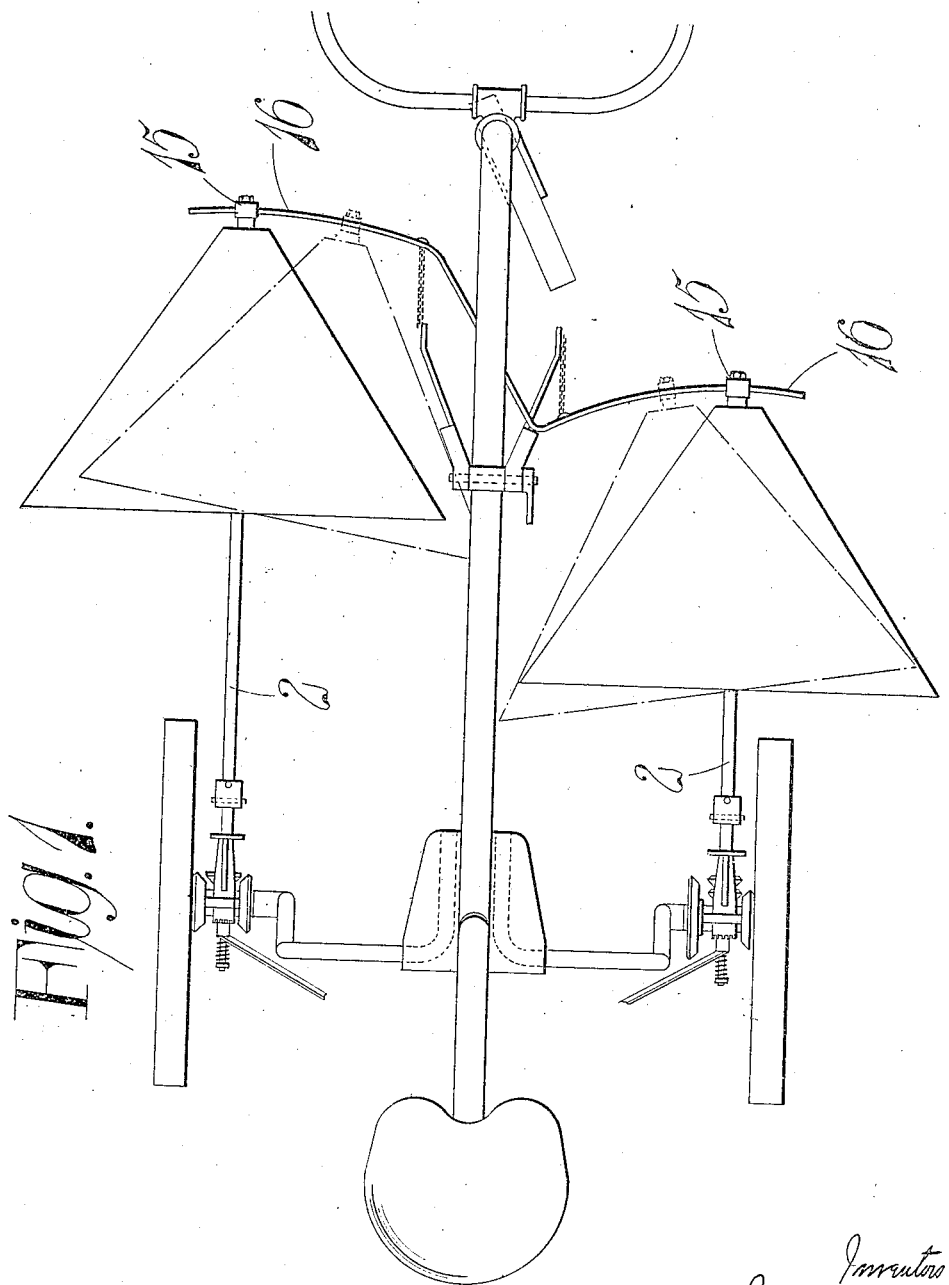

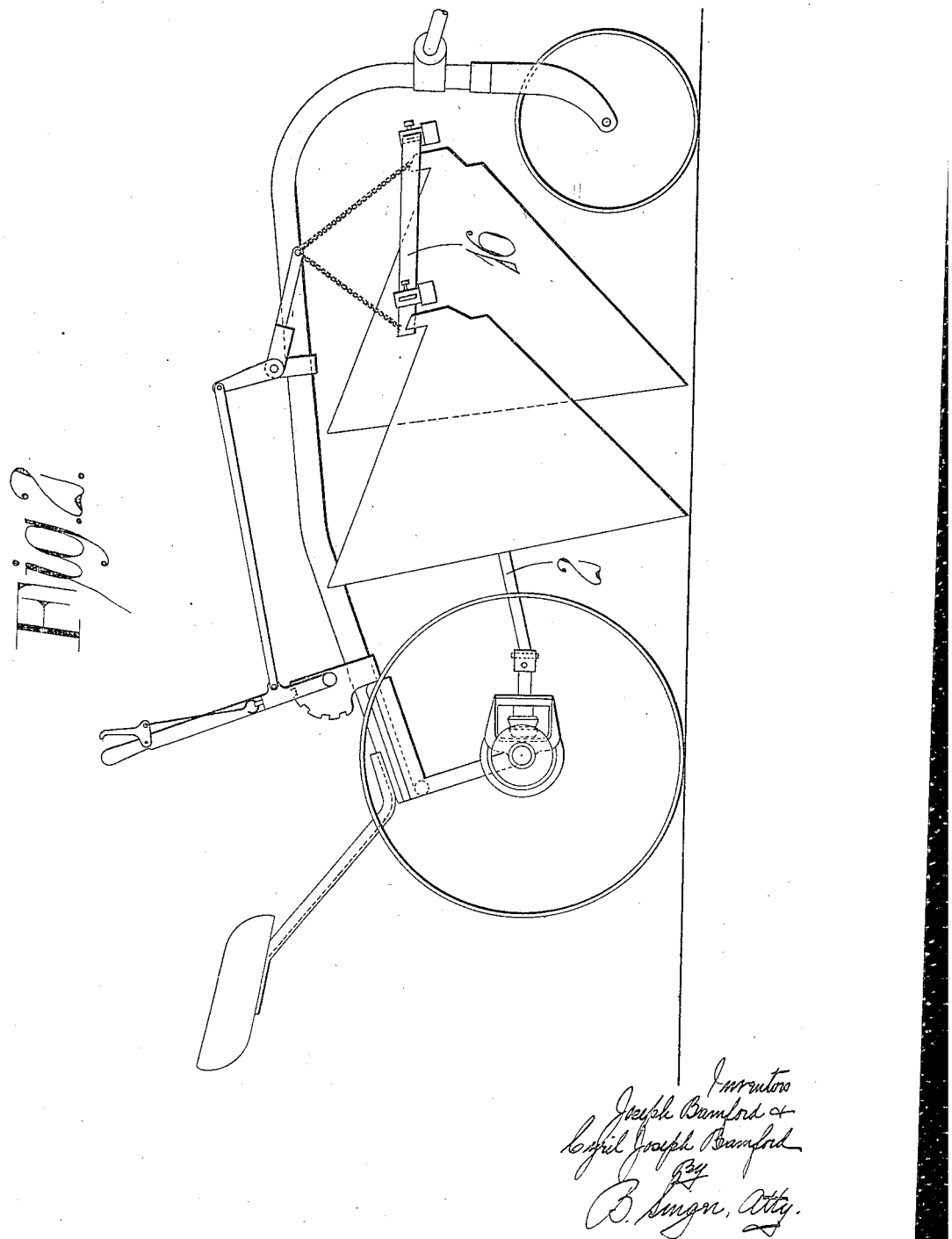

Jan. 16, 1923. 1,442,513
J. BAMFORD ET AL.
DRIVING GEAR FOR CONVERGING SHAFTS.
FILED AUG. 29, 1922.
3 SHEETS-SHEET 3
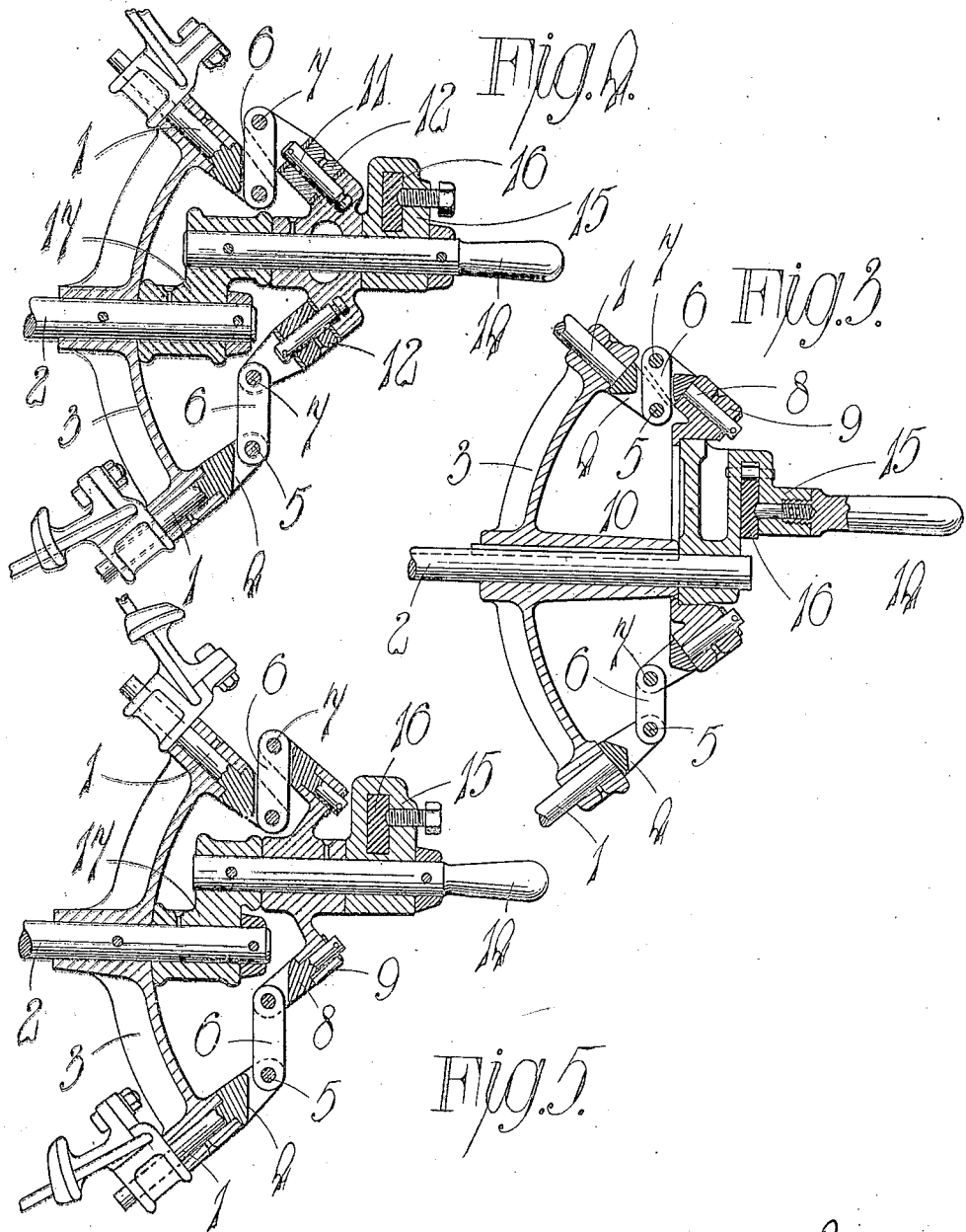

Patented Jan. 16, 1923.

1,442,513

UNITED STATES PATENT OFFICE.

JOSEPH BAMFORD AND CYRIL JOSEPH BAMFORD, OF UTTOXETER, ENGLAND.

DRIVING GEAR FOR CONVERGING SHAFTS.

Application filed August 29, 1922. Serial No. 585,067.

*To all whom it may concern:*

Be it known that we, JOSEPH BAMFORD and CYRIL JOSEPH BAMFORD, subjects of the King of Great Britain, residing at St. Marys Mount, Uttoxeter, in the county of Stafford, England, and The Parks, Uttoxeter, aforesaid, respectively, have invented certain new and useful Improvements in Driving Gears for Converging Shafts; and we do hereby declare the following to be a full, clear, and exact description of the same.

This invention relates to driving gear for shafts arranged in converging relationship around a centre and has for its object to provide an improved means for preventing each shaft from making a revolution upon its own centre each time the shafts revolve around their common centre.

Shafts arranged in the manner described are used in certain agricultural machines such as swath turners, side delivery rakes, or the like, and may also be used in other machines or apparatus. When applied to agricultural machines of the swath turner or side delivery rake type the converging shafts carry tines or rakes and as the shafts rotate about their common centre it is necessary to prevent each shaft from rotating on its own centre in order that the acting ends of the tines or rakes may always point towards the ground as they are carried around and remain substantially vertical as they approach and leave the ground.

In common with other devices of this class, our apparatus comprises links or cranks which are pivotally connected one to each of the converging shafts, the said links or cranks being connected pivotally each to a stud, all of said studs being mounted on a rotary carrier which is given a rotary movement around a centre which is eccentric in relation to the centre about which the converging shafts revolve.

One of the features of the present invention consists in arranging the studs to which the cranks or links are attached in converging relationship, each of said studs preferably being substantially parallel with the converging shaft with which it is associated. By employing this arrangement, a more compact and convenient apparatus is obtained.

Another feature of the present invention is to pivot the cranks or links to their studs by pivots which are arranged preferably at right angles to the plane of the crank or link.

A further feature of the present invention is to mount the stud carrier about an eccentric or cam mounted upon a central driving shaft about which the converging shafts rotate.

As a further feature of the invention, we may mount the tines or rakes upon the outer ends of the converging shafts and substantially in alignment therewith, so that a small and compact controlling head can be used to control tines which diverge to a comparatively large diameter.

Alternatively, instead of using an eccentric, each of the conewise reels may be rotatably mounted on the parallel portions of a non-rotating crank axle, rotary motion being applied to the tine-carrying reel through the medium of a tubular sleeve concentric with the said stationary axle in the known manner.

Referring to the drawings:—

Figure 1 is a plan view showing the general arrangement of a swath turner, to which the present invention can be applied.

Figure 2 is a view in side elevation of the machine.

Figure 3 is a sectional view in side elevation showing in detail one method of carrying our invention into effect.

Figure 4 is a view in sectional side elevation showing in detail another method of carrying our invention into practice.

Figure 5 is a sectional view in side elevation showing in detail a further method of carrying our invention into practice.

In the constructions illustrated in the drawings, the converging shafts 1 are arranged with their centres upon an imaginary cone around a central driving shaft 2 and the converging shafts 1 are mounted in a carrier 3 which is fixed to said shaft.

The inner end of each converging shaft 1 adjacent the shaft carrier 3 is provided with a projecting head 4, and each of these projecting heads has pivoted thereto at 5 a crank or link 6. These cranks or links 6 may be arranged substantially at right angles to the driving shaft 2 and their other ends are pivotally connected at 7 each one to a stud 8 which is mounted on a stud carrier 9. These studs 8 are arranged in converging relationship, each stud 8 preferably being parallel with the converging shaft 1 to which it is connected by a crank or link 6. The pivotal connection 7 between each stud and its crank or link, and 5 between each link and its shaft are upon pivots substantially at right angles to the plane containing the centre lines of the shaft 1, the link 6 and the stud 8.

The studs 8 are rotatably mounted in the stud carrier 9 and this stud carrier 9 is mounted upon the periphery of an eccentric 10 (see Figure 3) or crank throw 17 (see Figures 4 and 5) mounted upon the driving shaft 2.

Alternatively, instead of using an eccentric, the stud carrier 9 may be mounted upon a cranked stationary axle. The throw of the eccentric or crank is equal to the effective lengths of the cranks or links 6.

Instead of using bearings to carry the studs in the aforesaid stud carrier 9, this reel or carrier may be formed as shown in Figure 4 with pins or arms 11 projecting from its face, of a suitable conewise disposition, and upon each of the said pins or arms 11 may be mounted a bearing 12 having a suitable pivotal connection 7 for carrying the crank or link 6 connecting the two controlling reels.

In operation, as the driving shaft 2 revolves and carries with it the carrier 3 of the converging shafts 1, the stud carrier 9 revolves at the same rate, but through an eccentric orbit which keeps the cranks or links 6 substantially vertical so that if the converging shafts 1 are provided with projecting tines or rakes, the acting ends of these will point towards the ground as they are carried round, the tines remaining at substantially the same inclination to the vertical.

If required, when applied to an agricultural machine, the eccentric or crank may be provided with a projecting handle, such as 14 provided with a releasable retaining device 15 by which the eccentric or crank may be secured to a transverse bar 16 upon the machine so that the lateral position of the converging shafts which carry the tines or rakes can be altered as desired.

What I claim then is:—

1. Driving gear for shafts arranged in converging relationship around a centre comprising a central shaft, a plurality of converging shafts arranged in converging relationship around said central shaft, a rotary carrier arranged eccentrically with respect to said central shaft, converging studs mounted in said carrier, and links connecting said studs each with one of said converging shafts.

2. Driving gear for shafts arranged in converging relationship around a centre comprising a central shaft, a plurality of converging shafts arranged in converging relationship around said central shaft, a crank device mounted on said central shaft so that the shaft can rotate therein, a journal on said crank device, a rotary carrier arranged eccentrically with respect to said central shaft, and rotatably mounted on said journal, converging studs mounted in said carrier, and links connecting said studs each with one of said converging shafts.

3. Driving gear for shafts arranged in converging relationship around a centre comprising a central driving shaft, a plurality of converging shafts arranged in converging relationship around said central shaft, a carrier for said converging shafts, means for securing said carrier upon the driving shaft in driving relationship therewith, a rotary carrier arranged eccentrically with respect to said central shaft, converging studs mounted in said carrier, and links connecting said studs each with one of said converging shafts.

4. Driving gear for shafts arranged in converging relationship around a centre comprising a central driving shaft, a plurality of converging shafts arranged in converging relationship around said central shaft, a carrier for said converging shafts, means for securing said carrier upon the driving shaft in driving relationship therewith, a crank device mounted on said central shaft so that the shaft can rotate therein, a journal on said crank device, a rotary carrier arranged eccentrically with respect to said central shaft and rotatably mounted on said journal, converging studs mounted in said carrier, and links connecting said studs each with one of said converging shafts.

5. Driving gear for shafts arranged in converging relationship around a centre comprising a central shaft, a plurality of converging shafts arranged in converging relationship around said central shaft, a rotary carrier arranged eccentrically with respect to said central shaft, converging studs rotatably mounted in said carrier, links pivotally connecting said studs each with one of said converging shafts and pivots connecting said links with the studs and shafts, said pivots being arranged at right angles to the planes containing the axes of the corresponding stud and shaft.

6. Driving gear for shafts arranged in converging relationship around a centre comprising a central shaft, a plurality of converging shafts arranged in converging relationship around said central shaft, a crank device mounted on said central shaft so that the shaft can rotate therein, a journal on said crank device, a rotary carrier arranged eccentrically with respect to said central shaft and rotatably mounted on said journal, converging studs mounted in said carrier, and links connecting said studs each with one of said converging shafts, a slotted block on said journal, a supporting bar for the driving gear, said block engaging on said bar.

In witness whereof we affix our signatures.

JOSEPH BAMFORD.
CYRIL JOSEPH BAMFORD.